United States Patent [19] [11] 4,131,599
Brunetti et al. [45] Dec. 26, 1978

[54] STABILIZATION OF POLY(MONO-OLEFINS)

[75] Inventors: Heimo Brunetti, Reinach; Jean Rody, Basel, both of Switzerland; Nobuo Soma; Tomoyuki Kurumada, both of Hiromachi, Japan

[73] Assignees: Sankyo Company, Limited, Tokyo, Japan; Ciba-Geigy Corporation, Ardsley, N.Y.

[21] Appl. No.: 687,823

[22] Filed: May 19, 1976

[30] Foreign Application Priority Data

May 28, 1975 [GB] United Kingdom ............... 23352/75

[51] Int. Cl.² ...................... C08K 5/34; C07D 211/06
[52] U.S. Cl. ............................. 260/45.8 N; 106/176; 546/16; 546/192; 546/209; 546/227; 546/245; 546/248
[58] Field of Search ................................... 260/45.8 N

[56] References Cited

U.S. PATENT DOCUMENTS

| 3,103,542 | 9/1963 | Fielden | 260/45.8 N |
|---|---|---|---|
| 3,840,494 | 10/1974 | Murayama et al. | 260/45.8 N |
| 3,929,804 | 12/1975 | Cook | 260/45.8 N |
| 3,939,168 | 2/1976 | Cook | 260/45.8 N |
| 3,975,357 | 8/1976 | Murayama et al. | 260/45.8 N |
| 3,992,390 | 11/1976 | Holt | 260/45.8 N |
| 3,993,655 | 11/1976 | Rasberger et al. | 260/45.8 N |
| 3,998,784 | 12/1976 | Cook | 260/45.8 N |

FOREIGN PATENT DOCUMENTS

| 565893 | 9/1958 | Belgium. |
|---|---|---|
| 1216260 | 4/1960 | France. |
| 1274238 | 9/1961 | France. |
| 834290 | 5/1960 | United Kingdom. |
| 904415 | 8/1962 | United Kingdom. |

OTHER PUBLICATIONS

Chem. Abs., vol. 77, 62803n (1972).

*Primary Examiner*—H.S. Cockeram
*Attorney, Agent, or Firm*—Vincent J. Cavalieri

[57] ABSTRACT

Sterically hindered piperidines having at least 5 alkyl groups in ring positions 2,3,5 and 6 are usable as light-stabilizers for organic polymers. The nitrogen may be unsubstituted or may bear a mono- to tetravalent substituent. The compounds can be synthesized by a Wolf-Kishner reduction of polyalkyl 4-oxopiperidines optionally followed by a N-substitution reaction in a second step.

The stabilizers are added to the polymers in an amount of from 0.01 to 5% by weight. Preferred is the stabilization of polyolefins, styrene polymers, polyamides and polyurethanes.

12 Claims, No Drawings

STABILIZATION OF POLY(MONO-OLEFINS)

This invention relates to the stabilization of polymers. More particulary it relates to a process of stabilizing organic polymers against light-induced deterioration which consists in the addition of a polyalkylated piperidine derivative to the polymer.

It is known from the German laid open patent application No. 2,418,540 that piperidine derivatives which are tetraalkylated in the positions 2 and 6 can be used for the stabilization of polymers. These piperidine derivatives are defined by the formula

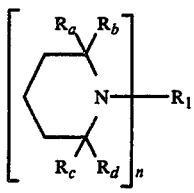

wherein $R_a$ and $R_b$ represent methyl groups or together with the C-atom to which they are attached they form a cyclohexane ring, $R_c$ is methyl and $R_d$ is alkyl having 1-5 C-atoms or $R_c$ and $R_d$ together with the C-atom to which they are attached form a tetramethylpiperidine ring and $R_1$ is oxygen, hydroxyl, alkyl, alkenyl, alkinyl, aralkyl, acyl or an appropriate divalent linking group.

Piperidines which are polyalkylated not only in the position 2 and 6 but also in position 3 and/or 5 have not become known as stabilizers for polymers. It has now been found that such higher alkylated piperidine derivatives are valuable stabilizers for organic polymers, especially against photo-deterioration. Furthermore also other properties such as the compatibility of these compounds are superior to conventional stabilizers. These higher alkylated piperidine derivatives are defined by formula I

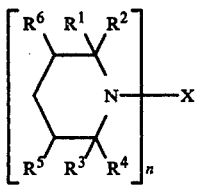

wherein
$R^1$ is alkyl having 2-6 C-atoms,
$R^2$ is alkyl having 1-6 C-atoms,
$R^3$ is alkyl having 1-9 C-atoms, phenyl, benzyl or phenylethyl,
$R^4$ is alkyl having 1-6 C-atoms or
$R^3$ and $R^4$ together with the C-atom to which they are attached represent a cyclopentyl or cyclohexyl group,
$R^5$ is alkyl having 1-5 C-atoms, alkenyl or alkinyl having 3-4 C-atoms or aralkyl having 7-8 C-atoms,
$R^6$ is hydrogen, alkyl having 1-5 C-atoms, alkenyl or alkinyl having 3-4 C-atoms, aralkyl having 7-8 C-atoms, and $R^5$ and $R^6$ are interchangeable,
n is 1 or 2, and if n is 1,
X is hydrogen, the oxyl radical, alkyl having 1-8 C-atoms, alkenyl having 3-6 C-atoms, alkinyl having 3 or 4 C-atoms, alkoxyalkyl having 2-21 C-atoms, aralkyl having 7-8 C-atoms, the 2,3-epoxypropyl group, an aliphatic acyl group having 1-12 C-atoms, or one of the groups —$CH_2COOR^7$, —$CH_2$—$CH(R^8)$—$OR^9$ or —$COOR^{10}$ wherein
$R^7$ is alkyl having 1-12 C-atoms, alkenyl having 3-6 C-atoms, phenyl, aralkyl having 7-8 C-atoms or cyclohexyl,
$R^8$ is H, $CH_3$ or phenyl,
$R^9$ is H or an aliphatic, aromatic, alicyclic or araliphatic acyl group having up to 18 C-atoms, which may optionally be substituted in its aryl moiety with chlorine, alkyl having 1-4 C-atoms, alkoxy having 1-8 C-atoms and/or hydroxy, and
$R^{10}$ is alkyl having 1-12 C-atoms, benzyl, cyclohexyl or phenyl and if n is 2,
X is alkylene having 4-8 C-atoms, 2-butenylene-1,4, a group —$CH_2CH(R^8)$—O—$R^{11}$—O—$CH(R^8)$—$CH_2$— wherein $R^{11}$ is an aliphatic or aromatic diacyl group having up to 12 C-atoms or X is a group —$CH_2$—COO—$R^{12}$—OOC—$CH_2$—, wherein $R^{12}$ is alkylene having 2-8 C-atoms or xylylene.

The invention further includes the use of isomeric mixtures of compounds of formula I as well as the use of acid addition salts of compounds of formula I.

In formula I $R^1$, $R^2$ and $R^4$ may be straight- or branched-chain alkyl groups having 2 to 6 C-atoms such as ethyl, propyl, butyl, iso-butyl, iso-pentyl or n-hexyl; $R^2$ and $R^4$ may also be methyl.

$R^3$ may be a straight- or branched-chain alkyl group having 1 to 9 C-atoms, e.g., methyl, ethyl, propyl, n-butyl, iso-butyl, iso-pentyl, n-hexyl, 2-ethylhexyl, nonyl or isononyl.

$R^5$ and $R^6$ may be alkyl groups having up to 5 C-atoms like methyl, ethyl, isopropyl, iso-butyl, n-pentyl. Preferably $R^5$ contains one C-atom less than $R^1$ and $R^6$ contains one C-atom less than $R^2$, and $R^5$ and $R^6$ are interchangeable. $R^5$ or $R^6$ may be an alkenyl or alkinyl group, for example allyl, methallyl, 2-butenyl or propargyl, especially allyl. $R^5$ and $R^6$ may be an aralkyl group such as benzyl, phenylethyl or methylbenzyl, preferably benzyl.

When X is an alkyl group having from 1 to 8 carbon atoms it may be e.g., methyl, ethyl, n-propyl, n-butyl, n-hexyl or n-octyl; especially an alkyl group having from 1 to 4 C-atoms and most preferably methyl.

When X is an alkenyl group having from 3 to 6 carbon atoms it may be e.g., allyl, 2-butenyl or 2-hexenyl; especially an alkenyl group having 3 or 4 carbon atoms, most especially allyl.

When X is an alkinyl group having from 3 to 4 carbon atoms it my be e.g., propargyl.

When X is an alkylene group having 4 to 8 C-atoms, it may be e.g. tetra-, hexa- or octamethylene.

When X is an alkoxyalkyl group having from 2 to 21 C-atoms, it may have from 1 to 3 C-atoms in its alkyl moiety and from 1 to 18 C-atoms in its alkoxy moiety, e.g. methoxymethyl, ethoxymethyl, 2-methoxyethyl, 2-ethoxyethyl, 2-n-butoxyethyl, 3-n-butoxypropyl, 2-octoxyethyl or 2-octadecyloxyethyl, especially an alkoxyalkyl group having altogether from 2 to 6 C-atoms.

When X is an aralkyl group having 7 or 8 C-atoms, it may be e.g., benzyl, phenylethyl or 4-methylbenzyl, especially benzyl.

When X is a group of the formula —$CH_2$—$COOR^7$, $R^7$ may be an alkyl group having from 1 to 12 C-atoms, e.g., methyl, ethyl, isopropyl, n-butyl, isobutyl, tert.butyl, isopentyl, octyl, decyl or dodecyl, an alkenyl group having from 3 to 6 C-atoms, e.g., allyl, 2-butenyl or 2-hexenyl, a phenyl group, an aralkyl group having 7 or 8 C-atoms, e.g., benzyl or phenylethyl, a cyclohexyl group, especially $R^7$ is an alkyl group from 1 to 4 C-atoms.

When X is a group $-CH_2COO-R^{12}-OOCCH_2-$, $R^{12}$ is an alkylene group having 2 to 8 C-atoms and may be e.g. ethylidene, butylidene or octylidene.

When X is a group of the formula $-CH_2-CH(R^8)-OR^9$, $R^8$ may be a hydrogen atom, a methyl group or phenyl group, preferably hydrogen, and $R^9$ may be a hydrogen atom or a monovalent acyl residue derived from an aliphatic, aromatic, alicyclic or araliphatic carboxylic acid having up to 18 C-atoms, for example $R^9$ may be an acetyl, propionyl, butyryl, octanoyl, dodecanoyl, stearoyl, acryloyl, benzoyl, chlorobenzoyl, toluoyl, isopropylbenzoyl, 2,4-dichlorobenzoyl, 4-methoxybenzoyl, 3-butoxybenzoyl, 2-hydroxybenzoyl, 3,5-di-tert.butyl-4-hydroxybenzoyl, $\beta$(3,5-di-tert.butyl-4-hydroxyphenyl)propionyl, phenylacetyl, cinnamoyl, hexahydrobenzoyl, 1- or 2-naphthoyl or decahydronaphthoyl residue.

When X is a group $-CH_2-CH(R^8)-O-R^{11}-O-CH(R^8)-CH_2-$, $R^{11}$ is a divalent aliphatic or aromatic diacyl group having up to 12 C-atoms and may be e.g., a malonyl, maleyl, succinoyl, sebacoyl, terephthaloyl or isophthaloyl group.

When X is an aliphatic acyl group having up to 12 C-atoms, it may be e.g., formyl, acetyl, acryloyl, crotonoyl, capryloyl or lauroyl.

When X is a group of the formula $-COOR^{10}$, $R^{10}$ may be an alkyl group having from 1 to 12 C-atoms, e.g., methyl, ethyl, isobutyl, octyl, decyl or dodecyl, a benzyl group, a cyclohexyl group or a phenyl group.

The piperidine derivatives having the aforementioned general formula I possess assymmetric carbon atoms. Accordingly, by the term "mixtures of isomers thereof" are meant not only mixtures of position isomers at 3- and 5-position but also various kinds of stereo isomers. At any stage of the synthesis of the compounds according to the invention, the mixture of isomers usually obtained in the preparation of the corresponding 4-piperidinone derivative which is used as starting material, can be separated by methods known per se.

Acid addition salts of compounds of formula I may be for example, salts of inorganic acids such as sulfuric, hydrochloric or phosphoric acid; organic carboxylic acids such as formic, acetic, valeric, stearic, oxalic, adipic, sebacic, maleic, benzoic, p-tert.butyl-benzoic, 3,5-ditert.butyl-4-hydroxybenzoic, salicylic or terephthalic acid; sulfonic acids such as methanesulfonic or p-toluenesulfonic acid; or organic phosphorus acids such as diphenyl phosphoric acid or phenyl phosphonic acid.

Preferred are compounds of formula I wherein $R^1$ and $R^3$ represent ethyl groups, $R^2$, $R^4$ and $R^5$ represent methyl groups, $R^6$ represent hydrogen and X represents a hydrogen atom, a methyl group, an acetyl, acryloyl or crotonoyl group or a group $-CH_2CH_2OR^9$, wherein $R^9$ is an aliphatic acyl residue having 2-12 C-atoms or a benzoyl, 3,5-di-tert.butyl-4-hydroxybenzoyl, or $\beta$-(3,5-di-tert.butyl-4-hydroxyphenyl)-propionyl group, particularly compounds wherein X is hydrogen or methyl.

The following is a list of individual piperidine derivatives of formula I. It is, however, to be understood that the present invention is not limited to these illustrating compounds.

2,6-diethyl-2,3,6-trimethylpiperidine
2,6-diethyl-1,2,3,6-tetramethylpiperidine
1-butyl-2,6-diethyl-2,3,6-trimethylpiperidine
1-octyl-2,6-diethyl-2,3,6-trimethylpiperidine
1-allyl-2,6-diethyl-2,3,6-trimethylpiperidine
1-benzyl-2,6-diethyl-2,3,6-trimethylpiperidine
2,6-diethyl-2,3,6-trimethylpiperidine-1-oxyl
1-(2-hydroxyethyl)-2,6-diethyl-2,3,6-trimethylpiperidine
1-(2-hydroxypropyl)-2,6-diethyl-2,3,6-trimethylpiperidine
1-(2-hydroxy-2-phenylethyl)-2,6-diethyl-2,3,6-trimethylpiperidine
1-(2,3-epoxypropyl)-2,6-diethyl-2,3,6-trimethylpiperidine
1-(2-acetoxyethyl)-2,6-diethyl-2,3,6-trimethylpiperidine
1-(2-lauroyloxyethyl)-2,6-diethyl-2,3,6-trimethylpiperidine
1-(2-stearoyloxyethyl)-2,6-diethyl-2,3,6-trimethylpiperidine
1-(2-benzoyloxyethyl)-2,6-diethyl-2,3,6-trimethylpiperidine
1-(2-acryloyloxyethyl)-2,6-diethyl-2,3,6-trimethylpiperidine
1-(2-acetoxypropyl)-2,6-diethyl-2,3,6-trimethylpiperidine
1-(lauryloxycarbonylmethyl)-2,6-diethyl-2,3,6-trimethylpiperidine
2,2,6,6-tetraethyl-3,5-dimethylpiperidine
2,2,6,6-tetraethyl-1,3,5-trimethylpiperidine
2,6-dipropyl-2,6-dimethyl-3-ethylpiperidine
2,6-dipropyl-2,6-dimethyl-3-ethylpiperidine-1-oxyl
1-allyl-2,6-dipropyl-2,6-dimethyl-3-ethylpiperidine
2,6-diisobutyl-2,6-dimethyl-3-isopropylpiperidine
2,6-diisobutyl-1,2,6-trimethyl-3-isopropylpiperidine
2,6-diisopentyl-2,6-dimethyl-3-isobutylpiperidine
2,6-diisopentyl-1,2,6-trimethyl-3-isobutylpiperidine
2,6-diisopentyl-2,6-dimethyl-3-isobutylpiperidine-1-oxyl
2-nonyl-6-ethyl-2,3,6-trimethylpiperidine
2-nonyl-6-ethyl-1,2,3,6-tetramethylpiperidine
2,2-di-n-butyl-6-ethyl-3,6-dimethylpiperidine
2-phenethyl-6-ethyl-2,3,6-trimethylpiperidine
2-phenyl-6-ethyl-2,3,6-trimethylpiperidine
2-ethyl-2,5-dimethyl-1-azaspiro[5.5]undecane
2-ethyl-1,2,5-trimethyl-1-azaspiro[5.5]undecane
1,4-bis(2,6-diethyl-2,3,6-trimethyl-1-piperidino)butane
1,6-bis(2,6-diethyl-2,3,6-trimethyl-1-piperidino)hexane
bis[$\beta$-(2,6-diethyl-2,3,6-trimethyl-1-piperidino)ethyl]-adipate
bis[$\beta$-(2,6-diethyl-2,3,6-trimethyl-1-piperidino)ethyl]-terephthalate
bis[$\beta$-(2,6-diethyl-2,3,6-trimethylpiperidino)ethyl]-isophthalate
1-benzoyloxy-2,6-diethyl-2,3,6-trimethylpiperidine
1-acetyl-2,6-diethyl-2,3,6-trimethylpiperidine
1-crotonoyl-2,6-diethyl-2,3,6-trimethylpiperidine
1-acetyl-2,2,6,6-tetraethyl-3,5-dimethylpiperidine
1-acetyl-2,6-dipropyl-2,6-dimethyl-3-ethylpiperidine
1-acryloyl-2,6-dipropyl-2,6-dimethyl-3-ethylpiperidine
1-ethoxycarbonyl-2,6-diethyl-2,3,6-trimethylpiperidine
1-octoxycarbonyl-2,6-diethyl-2,3,6-trimethylpiperidine
1-benzyloxycarbonyl-2,6-diethyl-2,3,6-trimethylpiperidine.
1-propargyl-2,6-diethyl-2,3,6-trimethylpiperidine
1-ethoxycarbonylmethyl-2,6-diethyl-2,3,6-trimethylpiperidine
1-hexoxycarbonylmethyl-2,6-diethyl-2,3,6-trimethylpiperidine 1,2ethylene-di[(2,6-diethyl-2,3,6-trimethylpiperidine-1)acetate].

The polyalkylated piperidines of formula I wherein X is hydrogen (Ia) can be prepared from the corresponding 4-oxopiperidines (II) by reduction, especially by the so-called Wolff-Kishner reaction which consists in heating the hydrazones under strong alkaline conditions.

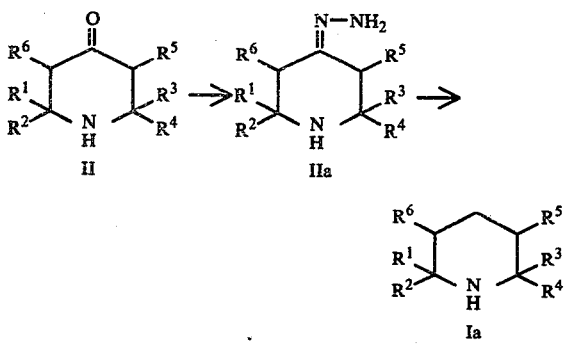

It is not necessary to isolate the hydrazones IIa and thus the ketones II may be reduced directly to the piperidines Ia by reacting with hydrazine and heating to about 150–200° C. after addition of a strong base, e.g. potassium hydroxide. A special procedure is to carry out this reaction in a high-boiling polar solvent, for example in diethylene glycol, as it is known as the Huang-Minlon reaction. A general description of the Wolff-Kishner reaction and its different variations in procedure can be found in "Organic Reactions" 4, 378 (1948).

The 4-oxopiperidines of formula II can be prepared by reacting an aliphatic ketone, this being a higher homologue of aceton, with ammonia. For example 2,3,6-trimethyl-2,6-diethyl-4-oxopiperidine is obtained from methyl ethyl ketone and ammonia, as is described by W. Traube in Chem.Berichte 41, 777 (1908).

Another method of synthesis is the hydrolysis of alkyl-substituted tetrahydropyrimidines in the presence of acidic catalysts, for example analogously to the process of U.S. Pat. No. 3,513,170.

Compounds of formula II having different substituents in 2- and 6-position are obtainable by first reacting a ketone $R^1$—CO—$R^2$ with ammonia and hydrolysing the formed pyrimidine derivative resulting in the formation of an amino ketone

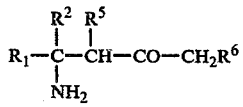

as is described in Helvet.Chim.Acta 30, (1947), 1114. In a second step this aminoketone is reacted with ammonia and a second ketone $R^3$—CO—$R^4$ resulting in a pyrimidine derivative as is described in Monatsh.Chemie 88 (1957), 464. From this the piperidone derivative II can be obtained by hydroylsis.

Such and similar methods of preparing alkylated 4-piperidones are further described in German laid open patent application Nos. 2,429,745; 2,429,746; 2,429,935; 2,429,936; 2,429,937.

Compounds of formula II in which $R^5$ or $R^6$ is hydrogen may be substituted in these positions by reaction with a secondary amine and by reacting the formed enamine with a reactive organic halide like allyl bromide or benzyl chloride obtaining compounds of formula II where $R^5$ or $R^6$ are allyl or benzyl or a similar substituent.

Compounds of formula I wherein X is other than hydrogen can be synthesized by substitution reactions of the NH-compounds Ia, as are generally known for the substitution of secondary amines. However, owing to the sterical hindrance by the alkyl groups $R^1$ to $R^4$ the substitutions reactions proceed more slowly than with unhindered secondary amines.

Thus the NH-compounds may be reacted e.g., with alkyl, alkenyl, aralkyl or alkoxyalkyl halides, with dialkyl sulfates, with epichlorohydrine, with esters of chloroacetic acid, with esters of chlorocarbonic acid, with carboxylic acid chlorides or anhydrides. The introduction of a group —$CH_2$—$CH(R^8)$—$OR^9$ is achieved by reaction with ethylene oxide, propylene oxide or styrene oxide, which may be followed by acylation, e.g. with an acyl chloride $R^9Cl$.

Compounds of formula I wherein X is the oxyl radical are obtainable from the corresponding NH-compounds by oxydation with percarboxylic acids, e.g. 3-chloroperbenzoic acid, or with hydrogen peroxide in the presence of catalysts like sodium tungstate.

Acid addition salts of the compounds of formula I may be prepared by neutralising the piperidine derivatives with the appropriate acids, preferably in an organic solvent or its mixture with water. The formation of a salt is not possible if X is an acyl group.

In accordance with the invention, it has now been discovered that the piperidines of formula I and acid addition salts thereof can effectively stabilize a wide range of organic polymers against light-induced deterioration with superior compatibility with polymer substrates. Polymers which can be stabilized in this way include:

1. Polymers of mono- or diolefins, for example polyethylene which can optionally be crosslinked, polypropylene, polyisobutylene, polymethylbutene-1, polymethylpentene-1, polyisoprene, polybutadiene.
2. Mixtures of the homopolymers cited under 1), for example mixtures of polypropylene and polyethylene, polypropylene and polybutene-1, polypropylene and polyisobutylene.
3. Copolymers of mono- and diolefins, for example ethylene/propylene copolymers, propylene/butene-1 copolymers, propylene/isobutylene copolymers, ethylene/butene-1 copolymers as well as terpolymers of ethylene and propylene with a diene, for example hexadiene, dicyclopentadiene or ethylidene norbornene.
4. Polystyrene.
5. Copolymers of styrene and of α-methylstyrene, for example styrene/butadiene copolymers, styrene/acrylonitrile copolymers, styrene/acrylonitrile/methylacrylate copolymers; high impact strength mixtures of styrene-copolymers and other polymers, such as polyacrylates or diene-polymers or ethylene-propylene-diene terpolymers; block copolymers of styrene such as styrene/butadiene/styrene, styrene/isoprene/styrene or styrene/ethylene-butylene/styrene.
6. Graft copolymers of styrene, for example the graft polymer of styrene to polybutadiene, the graft polymer of styrene with acrylonitrile to polybutadiene as well as mixtures thereof with the copolymers cited under 5., commonly referred to as acrylonitrile/butadiene/styrene or ABS plastics.
7. Halogen-containing vinyl polymers, for example polyvinyl chloride, polyvinylidene chloride, polyvinyl fluoride, polychloroprene, chlorinated rubbers, vinyl chloride/vinylidene chloride copolymers, vinyl chloride/vinyl acetate copolymers, vinylidene chloride/vinyl acetate copolymers.
8. Polymers which are derived from α,β-unsaturated acids and derivatives thereof, polyacrylates and polymethacrylates, polyacrylic amides and polyacrylonitrile.
9. Polymers which are derived from unsaturated alcohols and amines and from the acyl derivatives thereof or acetals, for example polyvinyl alcohol, polyvinyl acetate, polyvinyl stearate, polyvinyl benzoate, polyvinyl maleate, polyvinyl butyral, polyallyl phthalate, polyallyl melamine and copolymers thereof with other vinyl compounds, for example ethylene/vinyl acetate copolymers.
10. Homopolymers and copolymers which are derived from epoxides, for example polyethylene oxide, polypropylene oxide or polyisobutylene oxide.
11. Polyacetals, for example polyoxymethylene, as well as polyoxymethylenes which contain ethylene oxide as comonomer.
12. Polyphenylene oxides.
13. Polyurethanes and polyureas.
14. Polycarbonates.
15. Polysulphones.
16. Polyamides and copolyamides which are derived from diamines and dicarboxylic acids and/or from aminocarboxylic acids or the corresponding lactams, for example polyamide 6, polyamide 6/6, polyamide 6/10, polyamide 11, polyamide 12.
17. Polyesters which are derived from dicarboxylic acids and dialcohols and/or from hydroxycarboxylic acids or the corresponding lactones, for example polyethylene glycol terephthalate, poly-1,4-dimethylol-cyclohexane terephthalate.
18. Cross-linked polymers which are derived from aldehydes on the one hand and from phenols, ureas and melamines on the other, for example phenol/formaldehyde, urea/formaldehyde and melamine/formaldehyde resins.
19. Alkyd resins, for example glycerol/phthalic acid resins and mixtures thereof with melamine/formaldehyde resins.
20. Unsaturated polyester resins which are derived from copolyesters of saturated and unsaturated dicarboxylic acids with polyhydric alcohols as well as from vinyl compounds as cross-linking agents.
21. Cross-linked epoxide resins, derived from polyepoxides, e.g. from bis-glycidyl-ethers or from cycloaliphatic diepoxides.
22. Natural polymers, for example cellulose, rubber, proteins as well as the chemically modified homologous derivatives thereof, for example cellulose acetates, cellulose propionates and cellulose butyrates and the cellulose ethers, for example methyl cellulose.

From these the polymers of groups 1–6, 13 and 16 are of particular interest as the application of the stabilizers according to the invention has an outstanding effect on these polymers.

The stabilizer compounds of formula I are added to the polymers in an amount of from 0.01 to 5% by weight, based on the weight of the polymer. Preferably they are added in an amount of from 0.02 to 1.0 and most preferably from 0.05 to 0.5% by weight.

The stabilizers of formula I may readily be incorporated into the organic polymers by conventional techniques, at any convenient stage prior to the manufacture of shaped articles therefrom. For example, the stabilizer may be mixed with the polymer in dry powder form, or a solution or a suspension of the stabilizer may be mixed with a solution or suspension of the polymer.

The stabilized polymer compositions of the invention may optionally also contain other known stabilizers or other additives usually known in plastics technology, such as the additives listed in British Patent Specification No. 1,401,924, pages 11 to 13.

Synergistic effects may appear in using such known additives in combination with the stabilizers of formula I. This is especially true with other light-stabilizers and with organic phosphites.

Of particular importance is the combination of the light-stabilizers of formula I or Ia with antioxydants, especially for the stabilisation of polyolefins.

The invention is further illustrated by the following Examples in which all parts and percentages are by weight.

EXAMPLE 1

19.6 g of 2,4,6-triethyl-2,6-dimethyl-1,2,5,6-tetrahydropyrimidine and 0.4 g of ammonium bromide were added to 200 ml of methanol. To the mixture was added dropwise 10 g of 37% hydrochloric acid at 10° C., with stirring. After completion of the addition the whole was stirred at room temperature for 4 hours and there was then added a further 20 ml of 18% hydrochloric acid. The mixture was then heated at 30°–40° C. for 7 hours and allowed to stand over night at room temperature. The mixture was made alkaline with 40% aqueous potassium carbonate solution and, after methanol has been distilled off under reduced pressure, the residue was extracted with ether. The ether solution was dried over potassium carbonate and the ether was removed. The residue was subjected to distillation under reduced pressure to yield 2,6-diethyl-2,3,6-trimethyl-4-oxopiperidine as an oil boiling at 91°–93° C./2 mm Hg.

On using the equivalent amounts of
2,4,6-tripropyl-2,6-dimethyl-1,2,5,6-tetrahydropyrimidine
2,4,6-triisopentyl-2,6-dimethyl-1,2,5,6-tetrahydropyrimidine and
2,2,4,6,6-pentaethyl-5-methyl-1,2,5,6-tetrahydropyrimidine respectively instead of 2,4,6-triethyl-2,6-dimethyl-1,2,5,6-tetrahydropyrimidine in the above procedure there are obtained
2,6-dimethyl-2,6-dipropyl-3-ethyl-4-oxopiperidine (b.p. 156°–160° C./22 mm Hg)
2,6-dimethyl-2,6-diisopentyl-3-isobutyl-4-oxopiperidine (b.p. 125°–130° C./0.1 mm Hg) and
2,2,6,6-tetraethyl-3,5-dimethyl-4-oxopiperidine (m.p. 123° C.) respectively.

EXAMPLE 2

19.7 g of 2,6-diethyl-2,3,6-trimethyl-4-oxo-piperidine, 20 ml of diethylene glycol and 7 g of hydrazine hydrate are stirred for 2 hours at 80°–90° C. The resulting solution is dropped within 5 hours to a solution of 5 g KOH in 20 ml diethylene glycol at 160°–170° C. In order to facilitate the distilling off of the reaction product a solution of 5 g of hydrazine hydrate in 50 ml of water is gradually added to the reaction mixture at the rate at which the mixture of water and the formed piperidine derivative is distilling off. The oily layer in the trap is separated from the aqueous layer and distilled under reduced pressure. The resulting 2,6-diethyl-2,3,6-trimethylpiperidine (Compound No. 1) distills at 116° C. at 34 mm Hg.

If instead of diethyl-trimethyl-oxopiperidine the equivalent amount of 2,6-dimethyl-2,6-dipropyl-3-ethyl-4-oxopiperidine is used in this procedure there is obtained 2,6-dimethyl-2,6-dipropyl-3-ethylpiperidine (Compound No. 2), boiling at 90°–95° C. at 2 mm Hg.

EXAMPLE 3

18.3 g 2,6-diethyl-2,3,6-trimethylpiperidine, 100 ml of water, 10 g of formic acid and 40 ml of a 35% formaldehyde solution are heated to reflux for 60 hours. The reaction mixture is made alkaline by addition of concentrated NaOH solution and extracted with ether. The etheral solution is dried over $K_2CO_3$ and the ether is distilled off. On vacuum distillation of the residue 2,6-diethyl-1,2,3,6-tetramethyl piperidine is obtained (Compound No. 3) at 122° C./23 mm Hg.

EXAMPLE 4

36.7 g of 2,6-diethyl-2,3,6-trimethylpiperidine and 30 g of allyl bromide are stirred for 7 days with heating at about 75° C. The reaction mixture is made alkaline by addition of 200 ml of 2 n sodium hydroxide and is extracted with ether. The ethereal solution is dried over $K_2CO_3$ and evaporated. The residue is purified by fractional distillation yielding 1-allyl-2,6-diethyl-2,3,6-trimethylpiperidine (Compound No. 4) which distills at 132°–135° C./16 mm Hg.

By analogous treatment of diethyltrimethylpiperidine with benzyl bromide and octyl bromide respectively there is obtained 1-benzyl-2,6-diethyl-2,3,6-trimethylpiperidine (Compound No. 5) boiling at 87°–89° C./0.03 mm Hg and 1-octyl-2,6-diethyl-2,3,6-trimethylpiperidine (Compound No. 6) boiling at 95°–97° C. at 0.02 mm Hg.

EXAMPLE 5

27.5 g of 2,6-diethyl-2,3,6-trimethylpiperidine are dissolved in 100 ml of methylene chloride. To this solution there is dropped a solution of 65 g of m-chloroperbenzoic acid in 450 ml of methylene chloride at room temperature during about 4 hours. The solution becomes reddish and m-chlorobenzoic acid is then precipitating. After a stirring period of 12 hours the precipitate is sucked off and the filtrate is washed successively with diluted NaOH, water diluted hydrochloric acid and again with water. The solution is dried over $Na_2SO_4$ and evaporated. The residue is purified by fractional distillation at reduced pressure. The resulting 2,6-diethyl-2,3,6-trimethylpiperidine-1-oxyl (Compound No. 7) distills at 50°–52° C./0.1 mm Hg.

EXAMPLE 6

An autoclave is filled with 36.6 g 2,6-diethyl-2,3,6-trimethylpiperidine, 150 ml of methanol and 1 ml conc. hydrochloric acid. 11 g of ethylene oxide are added under a pressure of 2 atmospheres and the autoclave is heated to 100° C. for 24 hours. The methanol is distilled off and the residue is purified by fractional distillation which yields 1-(2-hydroxyethyl)-2,6-diethyl-2,3,6-trimethylpiperidine (Compound No. 8) boiling at 106° C./0.1 mm Hg.

EXAMPLE 7

7.8 g of 1-(2-hydroxyethyl)-2,6-diethyl-2,3,6-trimethylpiperidine (Compound No. 8) and 5 g of triethylamine are dissolved in 100 ml of toluene. To this solution is dropped 4.8 g benzoyl chloride dissolved in 20 ml toluene. After 6 hours of stirring at 80°–85° C. the reaction mixture is washed with water and the toluene solution is dried over $K_2CO_3$ and evaporated. The oily residue is purified by molecular distillation. The resulting 1-(2-benzoyloxyethyl)-2,6-diethyl-2,3,6-trimethylpiperidine distills at 120° C./0.005 mm Hg (Compound No. 9).

EXAMPLE 8

36.6 g of 2,6-diethyl-2,3,6-trimethylpiperidine (Compound No. 1) are heated with 70 g acetic acid anhydride for 24 hours at 85°–90° C. The resulting dark-brown solution is distilled under vacuum.

The 1-acetyl-2,6-diethyl-2,3,6-trimethylpiperidine (compound No. 10) distills at 84°–86° C. at 0.4 mm Hg.

EXAMPLE 9

34.1 g of 1-(2-hydroxyethyl)-2,6-diethyl-2,3,6-trimethylpiperidine (Compound No. 8) and 19.4 g diethyl sebacate are dissolved in 80 ml xylene. After addition of 2 g of lithium amide the solution is heated to 140° C. for 15 hours. The ethanol formed during the transesterification is distilled off currently. After 15 hours the reaction is finished. The reaction mixture is diluted with 200 ml xylene, cooled to 10°–15° C., washed twice with 50 ml water each and dried over sodium sulfate. The dried xylene solution is filtered over silica gel and evaporated. The residue is dried at 200° C. in a vacuum of 0.1 mm Hg for 12 hours. There is obtained bis[β-(2,6-diethyl-2,3,6-trimethyl-1-piperidino)ethyl]sebacate (Compound No. 11) as a high-viscous mass in analytical purity.

EXAMPLE 10

36.7 g of 2,6-diethyl-2,3,6-trimethylpiperidine (Compound No. 1) are dissolved in 200 ml toluene. A solution of 19 g acrylic chloride in 50 ml toluene is added slowly within an hour and the mixture is stirred at 70°–75° C. for 18 hours. After addition of 21.2 g of triethylamine the stirring is continued for another 24 hours. After cooling the reaction mixture is washed twice with 100 ml water each. The toluene solution is dried over sodium sulfate and evaporated. The residue is distilled in vacuo and there is obtained the 1-acryloyl-2,6-diethyl-2,3,6-trimethylpiperidine (Compound No. 12) as distillate at 133°–135° C./0.6 mm Hg.

EXAMPLE 11

100 parts polypropylene powder (Moplen, fibre grade, Montedison Comp.) and 0.2 parts octadecyl β-(3,5-di-tert.butyl-4-hydroxyphenyl)-propionate as antioxidant and 0.25 parts of a light-stabilizer listed in the Table are homogenised in a Brabender plastograph during 10 minutes at 200° C. The resulting mass is pressed to a 2 to 3 mm thick sheet in a laboratory press. The sheet is compression molded in a hydraulic press during 6 minutes at 260° C. and a pressure of 12 tons yielding a 0.5 mm thick film which is quenched immediately in cold water. By the same procedure a 0.1 mm film is made from the 0.5 mm film.

Test specimens of 66 × 44 mm are cut from the film and irradiated in a "Xenotest 150" radiation equipment. The content of carbonyl groups of the irradiated films is periodically controlled by infrared spectroscopy. The increase of carbonyl groups characterised by the infrared extinction at 5.85μ is a relevant measure for the light-induced deterioration of polypropylene (see L. Balaban et al., J. Polymer Sci., Part C, 22 (1969), 1059-1071) and is, according to experience, accompanied by a gradual loss of the mechanical properties of the polymer. The time to reach a carbonyl extinction of 0,30 at which the control sample is brittle was taken as a measure of the effectiveness of the stabilizers. The protective action of the different light-stabilizers of the invention is shown in the Table.

Table

| Compound (No. given in Examples 1-10) | Irradiation time (hours) to 0,30 Carbonyl extinction |
|---|---|
| none | 950 |
| No. 1 | 3350 |
| 2 | 3160 |
| 3 | 4260 |
| 4 | 6040 |
| 8 | 5870 |
| 9 | 4870 |

What we claim is:

1. A method of stabilizing polymono-olefins normally subject to ultraviolet deterioration comprising the addition of 0.01-5% by weight of a compound of formula I

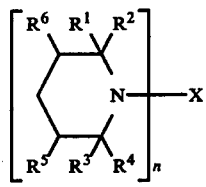

(I)

or a mixture of isomers thereof or an acid addition salt thereof
wherein
$R^1$ is alkyl having 2-6 C-atoms,
$R^2$ is alkyl having 1-6 C-atoms,
$R^3$ is alkyl having 1-9 C-atoms, phenyl, benzyl or phenylethyl,
$R^4$ is alkyl having 1-6 C-atoms or
$R^3$ and $R^4$ together with the C-atom to which they are attached represent a cyclopentyl or cyclohexyl group,
$R^5$ is alkyl having 1-5 C-atoms, alkenyl or alkinyl having 3-4 C-atoms or aralkyl having 7-8 C-atoms,
$R^6$ is hydrogen, alkyl having 1-5 C-atoms, alkenyl or alkinyl having 3-4 C-atoms, aralkyl having 7-8 C-atoms, and $R^5$ and $R^6$ are interchangeable,
n is 1 or 2, and if n is 1,
X is hydrogen, the oxyl radical, alkyl having 1-8 C-atoms, alkenyl having 3-6 C-atoms, alkinyl having 3 or 4 C-atoms, alkoxyalkyl having 2-21 C-atoms, aralkyl having 7-8 C-atoms, the 2,3-epoxypropyl group, an aliphatic acyl group having 1-12 C-atoms, or one of the groups —CH$_2$COOR$^7$, —CH$_2$CH(R$^8$)—OR$^9$ or —COOR$^{10}$, wherein
$R^7$ is alkyl having 1-12 C-atoms, alkenyl having 3-6 C-atoms, phenyl, aralkyl having 7-8 C-atoms or cyclohexyl
$R^8$ is H, CH$_3$ or phenyl,
$R^9$ is H or an aliphatic, aromatic, alicyclic or araliphatic acyl group having up to 18 C-atoms which may optionally be substituted in its aryl moiety with chlorine, alkyl having 1-4 C-atoms, alkoxy having 1-8 C-atoms or hydroxy, and combination thereof
$R^{10}$ is alkyl having 1-12 C-atoms, benzyl, cyclohexyl or phenyl and if n is 2,
X is alkylene having 4-8 C-atoms, 2-butenylene-1,4-, a group —CH$_2$CH(R$^8$)—O—R$^{11}$—O—CH(R$^8$)—CH$_2$—, wherein R$^{11}$ is an aliphatic or aromatic diacyl group having up to 12 C-atoms or X is a group —CH$_2$—COO—R$^{12}$—OOC—CH$_2$—, wherein R$^{12}$ is alkylene having 2-8 C-atoms or xylylene.

2. A method according to claim 1, wherein in formula I $R^5$ is alkyl and $R^6$ is alkyl or hydrogen and the number of C-atoms of $R^5$ is one less than that of $R^1$ and the number of C-atoms of $R^6$ is one less than that of $R^2$.

3. A method according to claim 1, wherein in formula I $R^1$ and $R^3$ are ethyl groups, $R^2$, $R^4$ and $R^5$ are methyl groups and $R^6$ is hydrogen.

4. A method according to claim 3, wherein in formula I $R^1$ and $R^3$ are ethyl groups, $R^2$, $R^4$ and $R^5$ are methyl groups, $R^6$ is hydrogen and X is hydrogen, methyl, acetyl, acryloyl, crotonoyl or a group —CH$_2$—CH$_2$OR$^9$, wherein $R^9$ is an aliphatic acyl residue having 2-12 C-atoms or a benzoyl, 3,5-di-tert.butyl-4-hydroxybenzoyl or β-(3,5-di-tert.butyl-4-hydroxyphenyl)-propionyl group.

5. A composition consisting of an polymono-olefins normally subject to ultraviolet deterioration and 0.01 to 5% by weight of a stabilizer of formula I

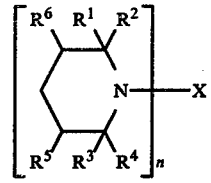

wherein
$R^1$ is alkyl having 2-6 C-atoms,
$R^2$ is alkyl having 1-6 C-atoms,
$R^3$ is alkyl having 1-9 C-atoms, phenyl, benzyl or phenylethyl,
$R^4$ is alkyl having 1-6 C-atoms or
$R^3$ and $R^4$ together with the C-atom to which they are attached represent a cyclopentyl or cyclohexyl group,
$R^5$ is alkyl having 1-5 C-atoms, alkenyl or alkinyl having 3-4 C-atoms or aralkyl having 7-8 C-atoms,
$R^6$ is hydrogen, alkyl having 1-5 C-atoms, alkenyl or alkinyl having 3-4 C-atoms, aralkyl having 7-8 C-atoms, and $R^5$ and $R^6$ are interchangeable,
n is 1 or 2, and if n is 1,
X is hydrogen, the oxyl radical, alkyl having 1-8 C-atoms, alkenyl having 3-6 C-atoms, alkinyl having 3 or 4 C-atoms, alkoxyalkyl having 2-21 C-atoms, aralkyl having 7-8 C-atoms, the 2,3-epoxypropyl group, an aliphatic acyl group having 1-12 C-atoms, or one of the groups —CH$_2$COOR$^7$, —CH$_2$—CH(R$^8$)—OR$^9$ or —COOR$^{10}$ wherein
$R^7$ is alkyl having 1-12 C-atoms, alkenyl having 3-6 C-atoms, phenyl, aralkyl having 7-8 C-atoms or cyclohexyl,
$R^8$ is H, CH$_3$ or phenyl,
$R^9$ is H or an aliphatic, aromatic, alicyclic or araliphatic acyl group having up to 18 C-atoms, which may optionally be substituted in its aryl moiety with chlorine, alkyl having 1–4 C-atoms, alkoxy having 1–8 C-atoms or hydroxy and combinations thereof, and $R^{10}$ is alkyl having 1–12 C-atoms, benzyl, cyclohexyl or phenyl and if n is 2, X is alkylene having 4–8 C-atoms, 2-butenylene-1,4, a group —$CH_2CH(R^8)$—O—$R^{11}$—O—$CH(R^8)$—$CH_2$— wherein $R^{11}$ is an aliphatic or aromatic diacyl group having up to 12 C-atoms or X is a group —$CH_2$—COO—$R^{12}$—OOC—$CH_2$—, wherein $R^{12}$ is alkylene having 2–8 C-atoms or xylylene or a mixture of isomers thereof or an acid addition salt thereof.

6. A composition according to claim 5 wherein the stabilizer is a compound of formula I, wherein $R^1$ and $R^3$ are ethyl groups, $R^2$, $R^4$ and $R^5$ are methyl groups and $R^6$ is hydrogen.

7. A composition according to claim 5 wherein the stabilizer is a compound of formula I, wherein $R^1$ and $R^3$ are ethyl groups, $R^2$, $R^4$ and $R^5$ are methyl groups, $R^6$ is hydrogen and X is hydrogen, methyl, acetyl, acryloyl, crotonoyl or a group —$CH_2$—$CH_2OR^9$, wherein $R^9$ is an aliphatic acyl residue having 2–12 C-atoms or a benzoyl, 3,5-di-tert.butyl-4-hydroxybenzoyl or β-(3,5-di-tert.butyl-4-hydroxyphenyl)-propionyl group.

8. A composition according to claim 5 wherein the stabilizer is 2,6-diethyl-1,2,3,6-tetramethylpiperidine.

9. A composition according to claim 5 wherein the stabilizer is 1-octyl-2,6-diethyl-2,3,6-trimethylpiperidine.

10. A composition according to claim 5 wherein the stabilizer is 1-(2-hydroxyethyl)-2,6-diethyl-2,3,6-trimethylpiperidine.

11. A composition according to claim 5 wherein the stabilizer is 1-(2-benzoyloxyethyl)-2,6-diethyl-2,3,6-trimethylpiperidine.

12. A composition according to claim 5 wherein the stabilizer is bis-[β-(2,6-diethyl-2,3,6-trimethyl-1-piperidino) ethyl]sebacate.

* * * * *